United States Patent [19]
Lombardi

[11] 3,994,502
[45] Nov. 30, 1976

[54] AUDIBLE CANDLE HOLDER

[75] Inventor: John Lombardi, Ozone Park, N.Y.

[73] Assignee: Lawrence Peska Associates, Inc., New York, N.Y. ; a part interest

[22] Filed: Oct. 1, 1975

[21] Appl. No.: 618,353

[52] U.S. Cl. .................................. 274/2; 274/9 RA
[51] Int. Cl.² ............................................ G11B 1/00
[58] Field of Search ................ 274/9 RA, 9 B, 9 R, 274/1 A, 1 R, 2, 23 R

[56] References Cited
UNITED STATES PATENTS

| | | | |
|---|---|---|---|
| 1,063,821 | 6/1913 | Mertz | 274/2 |
| 1,351,778 | 9/1920 | Malmberg | 274/2 |
| 2,489,146 | 11/1949 | Louchheim | 274/2 |
| 2,930,624 | 3/1960 | Banholzer | 274/9 RA |
| 3,371,933 | 3/1968 | Weitzner | 274/9 RA |
| 3,511,509 | 5/1970 | Firestone | 274/9 RA |

Primary Examiner—Richard E. Aegerter
Assistant Examiner—John W. Shepperd
Attorney, Agent, or Firm—Jack D. Slobod

[57] ABSTRACT

A candle holder secured upstanding from a cylindrical base housing a turntable which carries a record disc having plural radially spaced sound tracks of the prayer of Grace in different languages or religions. Plural radially inwardly directed elevationallly pivoted arms of different lengths are angularly spaced within the base, each carrying a needle over a different sound track and an angularly moveable radially directed bar bears on a selected one of the arms for engagement of a selected sound track.

1 Claim, 4 Drawing Figures

AUDIBLE CANDLE HOLDER

FIELD OF THE INVENTION

The present invention relates generally to audible novelty devices. In its particular aspects the present invention relates to an audible candle holder having a record playing means in the base of the holder.

BACKGROUND OF THE INVENTION

The prayer of Grace is generally said in conjunction with the lighting of a candle. If a candle holder could be provided with an audible recording of the prayer of Grace, there would result a deeply meaningful and useful object. In the prior art various musical or audible novelty devices have been known. However, none are suitable for the purposes of the present invention.

OBJECTS OF THE INVENTION

It is an object of the present invention to provide a candle holder having a record player in its base which may be easily manipulated to play a selected one of a plurality of sound tracks carried therein, so that the tracks may contain the Prayer of Grace according to various versions.

It is another object of the present invention to provide an audible candle holder of simple design which may contain a sound track associated with the lighting of a candle.

SUMMARY OF THE INVENTION

Briefly, the aforementioned and other objects of the present invention are satisfied by providing a candle holding means upstanding from a cylindrical base which houses a turntable mounted coaxially with the base. A disc record carried on the turntable has plural radially spaced circular sound tracks. To enable easy and rapid selection of a particular sound track to be played, a different needle is mounted over each sound track, carried at the ends of angularly-spaced radially inwardly extending arms which are pivotly mounted at locations spaced along the circular periphery of the base.

The arms are normally biased independently by spring means for urging the needles to be spaced above the sound tracks. A bar extending radially from the center of the base, is settable selectively into angularly spaced notches in an angularly elongated slot in the base through which the bar passes. The notches are aligned with the arms to enable the bar to be positioned to urge any selected one of the arms to carry its needle into engagement with a desired sound track.

Other objects, features and advantages of the present invention will become apparent upon perusal of the following detailed description of the preferred embodiment thereof when taken in conjunction with the appended drawing wherein.

DETAILED DESCRIPTION

Figure 1:
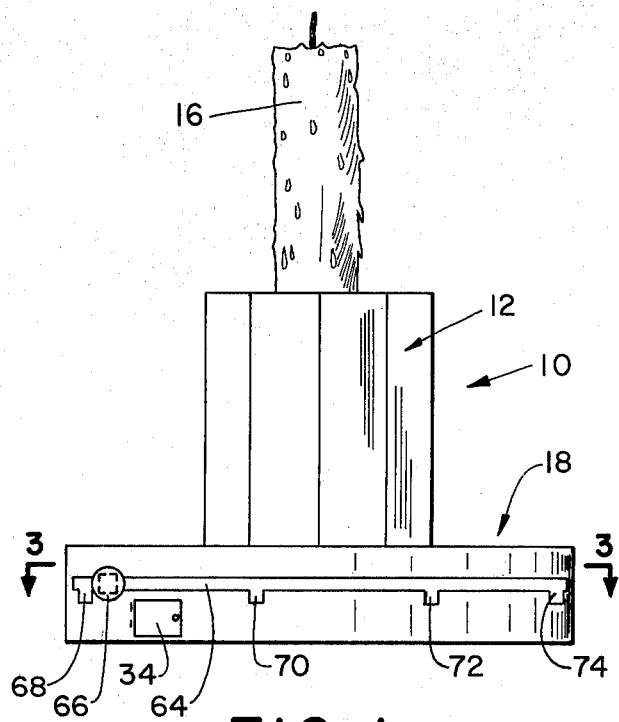
FIG. 1 is a front elevational view of the audible candle holder of the present invention.
Figure 2:
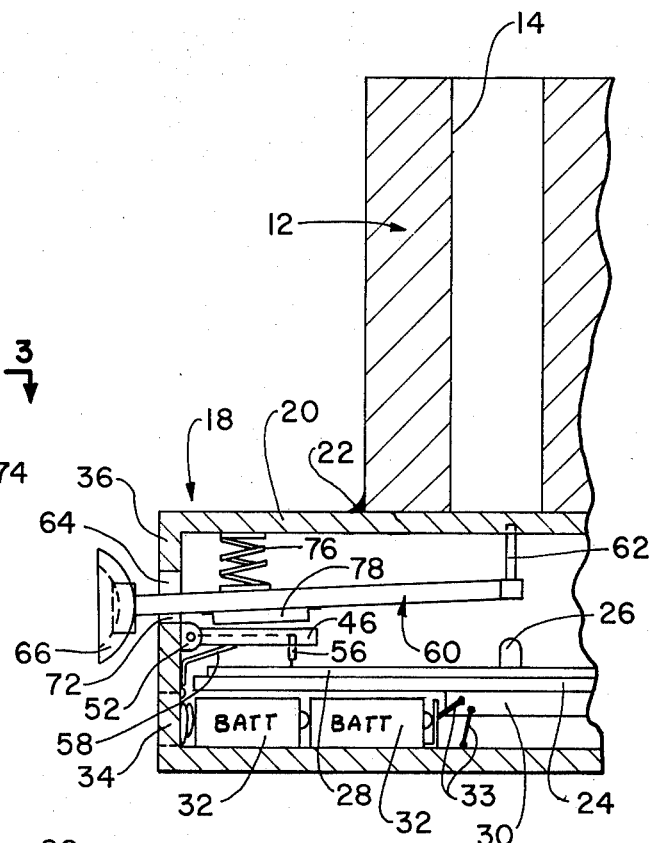
FIG. 2 is a central elevational cross-sectional view of FIG. 1.

Referring to FIGS. 1 through 4 of the drawing, the audible candle holder apparatus of the present invention is generally indicated by the reference numeral 10. The apparatus 10 comprises a tubular metal rod 12 of hexagonal cross-section which has a central circular bore 14 for receiving a candle 16. The rod 12 is secured coaxially upstanding from the top planar surface 18 of a hollow cylindrical metal base 20 by any suitable means such as welding along a fillet 22.

Within base 20 a turntable 24 is mounted coaxial with the base. Turntable 24 has the usual central vertical guide pin 26 for locating a record disc 28 coaxially on the turntable. The turntable is revolved by a D.C. electric motor 30 which is energized by a pair of series connected batteries 32 in a circuit that includes leads 33 and the walls of base 20. Batteries 32 are loaded into the base 20 via a door 34 in the circular sidewall 36 of the base.

Figure 3:
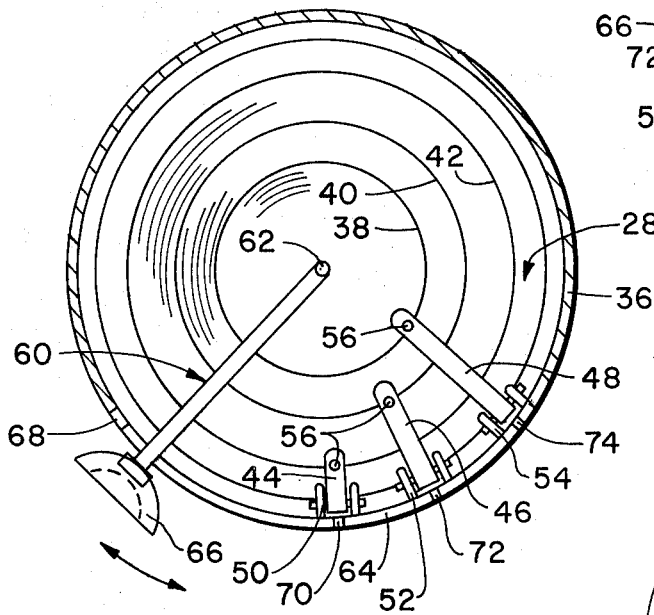
FIG. 3 is a cross-sectional top view taken along the lines 3—3 in FIG. 1.
Figure 4:
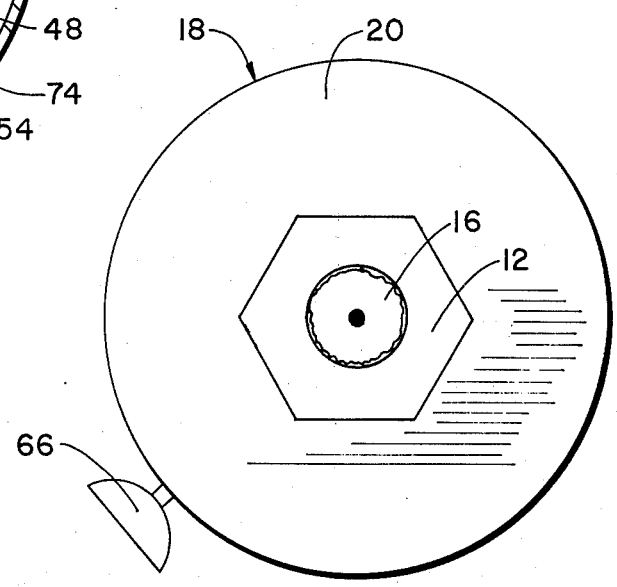
FIG. 4 is a top view of FIG. 1.

As shown in FIG. 3, the record disc 28 has three radially separated or spaced circular sound tracks 38, 40 and 42. Preferably each of the sound tracks 38–42 contains the prayer of Grace either according to different religions or in different languages. Further, three arms 44, 46 and 48 of different lengths are respectively pivotly mounted to the inside of the circular sidewall 36 at three angularly locations 50, 52 and 54 to enable elevational rotation of the arms. The respective arms 44–48 extend radially inward from locations 50–54 and carry needles 56 at their free ends over the respective sound tracks 38–42.

Normally, the arms 46–48 are independently biased to rotate upwards with the points of the needles 56 spaced above the sound tracks 38–42 by leaf spring 58 acting between the arms and the circular sidewall 36. In order to urge a selected one of the arms 44–48 to rotated downward for engagement of a needle 56 in a desired one of the tracks 38–42 a bar 60 is provided mounted rotatably at one end to a flexible shaft 62 projecting downward from the center of top wall 20.

The bar 60 extends generally radially from the center of base 12 and passes through an angularly elongated slot 64 in the circular sidewall 36 and terminates in a concave-convex combined knob and sound directing member 66. As should be apparent from FIGS. 2 and 3, the bar 60 may be rotated about shaft 62 to be aligned over any of the angularly spaced arms 44–48.

Four notches 68, 70, 72 and 74 are provided directed downward from the lower edge of slot 64 at angularly spaced locations and are provided of sufficient width to receive bar 60. Notch 68 corresponds to an "off" position for bar 60 and may be associated with a normally closed microswitch (not shown) for opening the circuit for energizing motor 30. The notches 70–74 are respectively located at the arm mounting locations 50–54 in angular alignment with arms 44–48.

Furthermore, a spring 76 carried by bar 60 acts between the bar 60 and top wall 22 to urge the bar downward into any of the notches 68–74 by causing the shaft 62 to flex or bend slightly. With the bar 60 received in one of the active notches 70–74, in alignment over the associated one of arms 44–48, a downwardly projecting boss or block 78 carried on the underside of the bar bears on the arm to force needle 56 into engagement with the associated one of sound tracks 38–42. As the record disc 28 is rotated, vibrations are transferred from the needle 56, to the playing arm such as arm 46 and then to bar 60 via block 78. The vibrations then emanate from sound directing member 60.

While the preferred embodiment of the present invention has been described in specific detail, it should be understood that numerous modifications, additions and omissions in the details thereof are possible within the intended spirit and scope of the invention claimed herein.

What is claimed is:

1. An audible candle holder apparatus comprising: a generally cylindrical hollow base defined by a cylindrical sidewall and circular top and bottom planar walls; a disc record within said base having plural radially spaced upwardly facing sound tracks; means within said base for playing a selected sound track of said record; and a candle holding barrel secured to and upstanding from said top wall; said record playing means within said base comprising; a generally horizontal turntable carrying said record; said turntable being mounted coaxially with and within said base; a plurality of generally horizontal arms of different lengths means mounting said arms at one end to the sidewall for elevational pivoting respectively at angularly spaced apart mounting locations; said plurality of arms being directed radially inward from said sidewall and being located above said turntable and record; the inwardly directed ends of the arms remote from said mounting locations respectively being positioned directly above different ones of said sound tracks; a downwardly directed needle carried by the inwardly directed end of each arm for engagement in the sound track directly below; spring means exerting an upwards force on each arm for independently biasing each arm to a position with the needle carried by each arm being spaced above the record; an angularly elongated slot in said sidewall above said arms; a plurality of angularly spaced apart notches in said sidewall communicating with and directed downward from said slot; said notches respectively lying in angular alignment with said mounting locations for said arms; a generally horizontally directed bar with said base and above said plurality of arms, means mounting said bar at one end to the center of said top wall both for rotation about the axis of said base and for elevational downward swinging movement; the other end of said bar extending radially outward from said base through said slot and terminating in a combined sound directing means and knob means for manual rotation of said bar, said arm being positionable in angular alignment with a selected one of said arms, and means carried by said bar for exerting a downward force on said bar whereby said bar may swing downward into the notch which is in angular alignment with said selected arm in order to contact and exert a downward force on said selected arm for said selected arm to swing downward and engage its needle in the sound track directly below said needle.

* * * * *